US006424293B2

(12) United States Patent
Weedon et al.

(10) Patent No.: US 6,424,293 B2
(45) Date of Patent: Jul. 23, 2002

(54) ELECTRONIC TIMING SYSTEMS

(75) Inventors: Robert John Weedon, Romsey; Keith Roland Stribley, West Byfleet, both of (GB)

(73) Assignee: Roke Manor Research Limited, Hampshire (GB)

(*) Notice: Subject to any disclaimer, the term of this patent is extended or adjusted under 35 U.S.C. 154(b) by 0 days.

(21) Appl. No.: 09/843,292

(22) Filed: Apr. 27, 2001

(30) Foreign Application Priority Data

Apr. 27, 2000 (GB) .............................................. 0010147

(51) Int. Cl.[7] .............................. G01S 5/14; G01S 1/24
(52) U.S. Cl. .................................. 342/357.06; 342/387
(58) Field of Search ............................. 342/357.06, 387

(56) References Cited

U.S. PATENT DOCUMENTS 5,319,374 A * 6/1994 Desai et al. ............ 342/357.06

* cited by examiner

*Primary Examiner*—Thomas H. Tarcza
*Assistant Examiner*—Fred H Mull
(74) *Attorney, Agent, or Firm*—Crowell & Moring LLP

(57) ABSTRACT

A time offset measurement system for the timing of events at spaced apart locations comprising at each location, a dual frequency Global Positioning System (GPS) receiver having operatively associated with it a GPS antenna, wherein both the GPS receiver and the antenna are dual frequency (L1, L2), and the former is capable of both Coarse Acquisition (C/A) Code and carrier phase measurements, a frequency reference source giving local time, a data-logger for logging GPS data, a Time Interval Counter (TIC) used to measure the time of a local event as defined by the frequency reference source relative to time as determined based on on GPS data and further comprising a central processor system (CPS), and a communication system via which the logged GPS data and time interval data, are received at the CPS from each location, the CPS being arranged to derive in accordance with a predetermined algorithm, for each pair of sites a primary time-offset figure based on a direct signal path between the sites, and a secondary time-offset figure based on at least one indirect signal path between the sites, wherein confidence that correct system operation is obtained is indicated based upon correspondence between the primary and secondary time-offset figures.

10 Claims, 3 Drawing Sheets

ELECTRONIC TIMING SYSTEMS

This invention relates to electronic timing systems and more especially but not exclusively it relates to systems for the measurement of precise time intervals between events at mutually spaced locations as may for example be required to measure the height of an aircraft by noting the time of reception, at a plurality of spaced apart locations, of a signal transmitted from the aircraft.

A system of the kind just before referred to forms the subject of our co-pending Patent Application GB 0003486.8 to which attention is hereby directed.

The specification accompanying our co-pending Patent Application describes a time offset measurement system for the timing of events at least two spaced apart locations comprising at each location, a dual frequency Global Positioning System (GPS) receiver having operatively associated with it a GPS antenna, wherein both the GPS receiver and the antenna are dual frequency (L1, L2), and the former is capable of both Coarse Acquisition (C/A) Code and carrier phase measurements, a frequency reference source giving local time, a data-logger for logging GPS data, a Time Interval Counter (TIC) used to measure the time of a local event as defined by the frequency reference source relative to time as defined in dependence on GPS data and further comprising a central processor system (CPS), and a communication system via which the logged GPS data and time interval data, are received at the CPS from each location, the CPS being arranged to derive a time-offset figure, in accordance with a predetermined algorithm, which time-offset figure is indicative of the difference between the times measured by the local clocks at the two sites, the time-offset figure thus derived being applied to the time interval measurements to calculate the precise, relative, time difference between events occurring at the two sites.

As described in the specification accompanying the co-pending Patent Application, the system may be used in applications where the timing of events at several widely spaced locations is required, appropriate time intervals being computed in each case. Although for most applications the reliability of the system described is perfectly acceptable, for some applications it is highly desirable that event timing is effected with a very high degree of confidence in timing reliability, so that the development of a system fault which affects timing can be identified without delay.

It is therefore an important object of the present invention to provide system in which this high level of confidence is provided.

According to the present invention, a time offset measurement system for the timing of events at spaced apart locations comprises at each location, a dual frequency Global Positioning System (GPS) receiver having operatively associated with it a GPS antenna, wherein both the GPS receiver and the antenna are dual frequency (L1, L2), and the former is capable of both Coarse Acquisition (C/A) Code and carrier phase measurements, a frequency reference source giving local time, a data-logger for logging GPS data, a Time Interval Counter (TIC) used to measure the time of a local event as defined by the frequency reference source relative to time as defined in dependence on GPS data and further comprising a central processor system (CPS), and a communication system via which the logged GPS data and time interval data, are received at the CPS from each location, the CPS being arranged to derive in accordance with a predetermined algorithm, for each pair of sites a primary time-offset figure based on a direct signal path between the sites, and a secondary time-offset figure based on at least one indirect signal path between the sites, wherein confidence that correct system operation obtains is indicated in dependence upon correspondence between the primary and secondary time-offset figures.

The secondary time-offset figure may be an aggregate time-offset figure based on a plurality of indirect signal paths between the sites.

It will be appreciated when the system is functioning correctly, the primary and secondary time-offset figures for a given pair of sites should be the substantially same (allowing for measurement tolerances) and thus the absence of correspondence therebetween can be deemed to indicate a system fault.

One embodiment of the invention will now be described, by way of example, with reference to the accompanying drawings in which.

Figure 1:
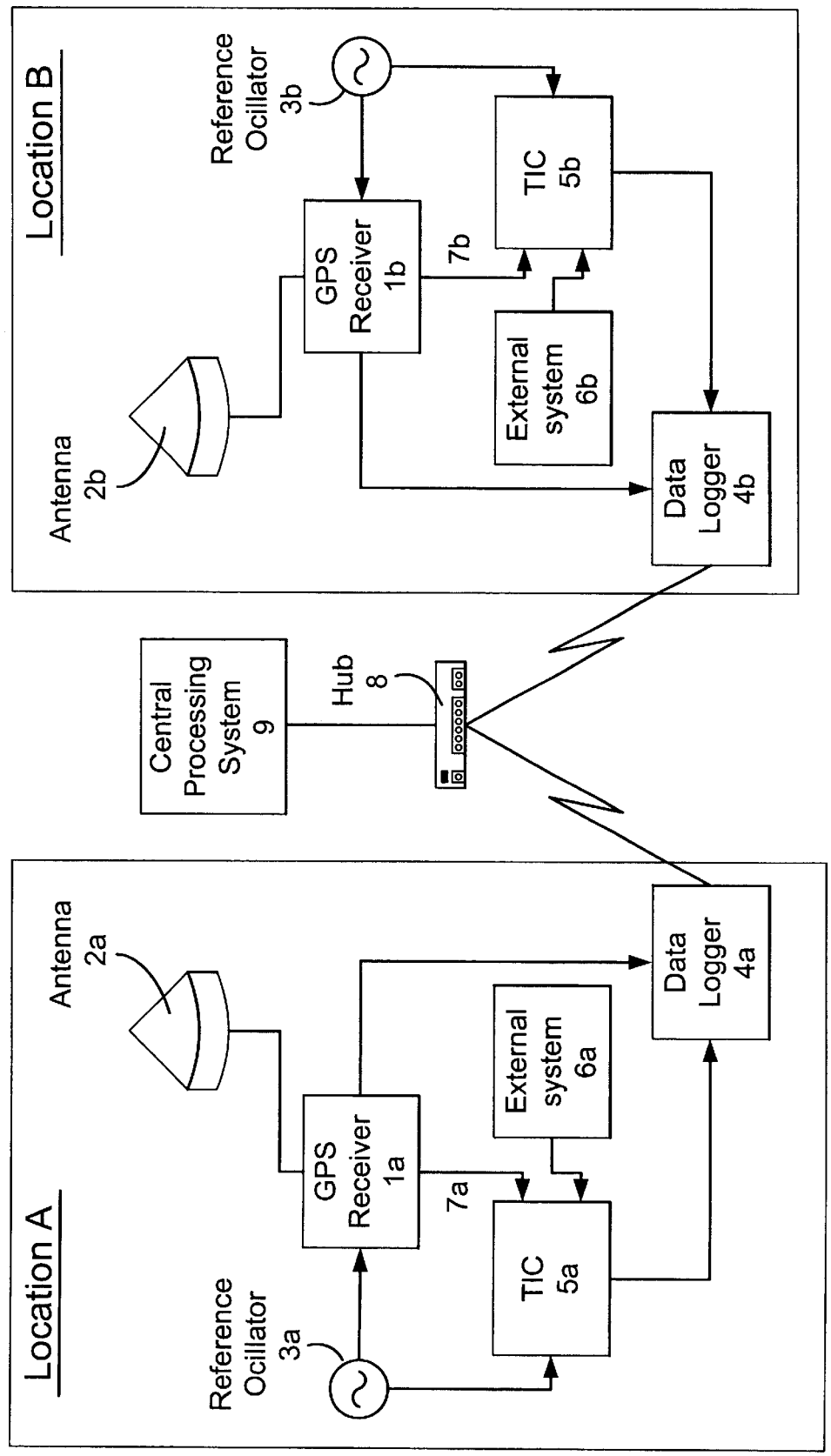
FIG. 1, is a schematic block diagram of a time interval measurement system for use at widely spaced locations.

Referring to FIG. 1, consider now the system at location A in FIG. 1. A GPS receiver 1a, receives signals on both L1 and L2 frequencies from all the GPS satellites in view of an antenna 2a. An internal clock of the GPS receiver 1a, is locked to the frequency from an oscillator 3a, which in this case is external to the receiver. The GPS receiver sends data to a data-logger 4a, at regular intervals. For each satellite in view, this data comprises: a C/A code pseudo range measurement; carrier phase data (in the form of an Accumulated Doppler Range (ADR) measurement on both L1 and L2 frequencies); and ephemeris data (from which the satellite's position can be calculated).

A time interval counter 5a, uses the frequency from the reference oscillator 3a, to measure the time difference between the arrival of a pulse from an external system 6a, and a pulse from the GPS receiver's clock 7a. This measurement is sent to the data logger 4a.

The measurement data is continuously sent from the data logger 4a, over a data link, which in this example is an Ethernet link, to a system hub 8, and CPS 9.

Similar apparatus is provided at the location B, which bears the same numerical designation distinguished by a 'b' suffix.

Figure 2:
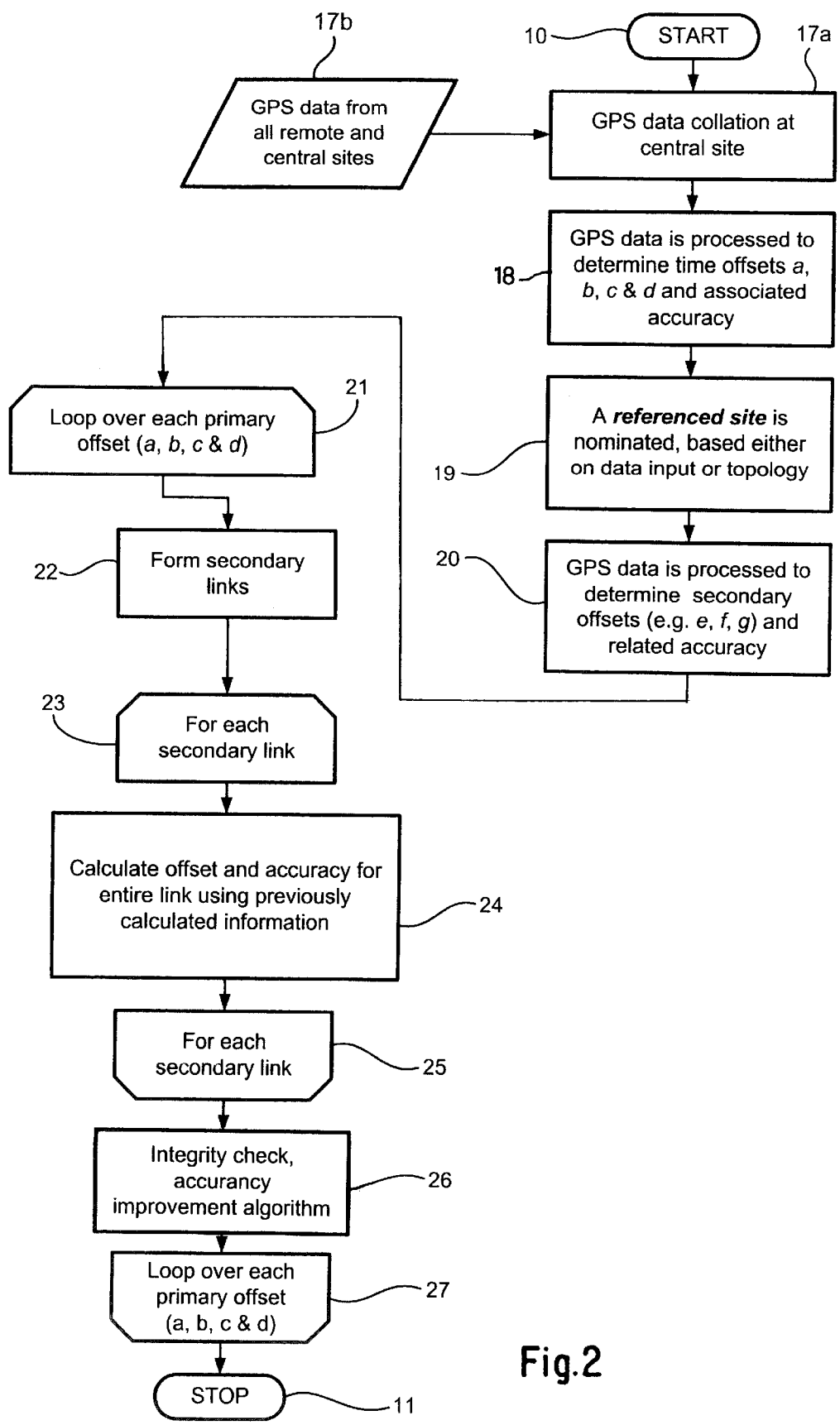
FIG. 2, is a flow diagram showing the main operational steps of an algorithm as used by a processor forming a part of the system of FIG. 1 in which primary and secondary links are used; and, FIGS. 2a, 2b, 2c, and 2d, are inset diagrams which are positioned alongside steps of the algorithm to which they relate as appropriate.

The CPS 9 collates the data from the data-loggers 4a, 4b for each time interval. An algorithm comprising operational steps as shown in FIG. 2, is then applied to the collated data to extract the time interval between the two receiver clocks using primary and secondary time interval measurements. These time interval measurements are then used not only to determine the precise time interval between the pulses from 6a and 6b (as explained in detail in our co-pending Patent Application) but also to establish a confidence level by means of an integrity check, as will now be explained with reference to FIG. 2.

Referring now to FIG. 2, the operational steps performed by the algorithm are as shown between a start function 10, and a stop function 11, and provide for integrity monitoring utilising primary and secondary time-offsets between five sites 12, 13, 14, 15, and 16, depicted by way of illustration only, in a configuration which corresponds to the 'five' on a die, as shown in the inset diagrams FIGS. 2a, 2b, 2c, and 2d of FIG. 2, wherein the inset diagrams are positioned alongside appropriate operational steps in the algorithm.

Figure 2A:
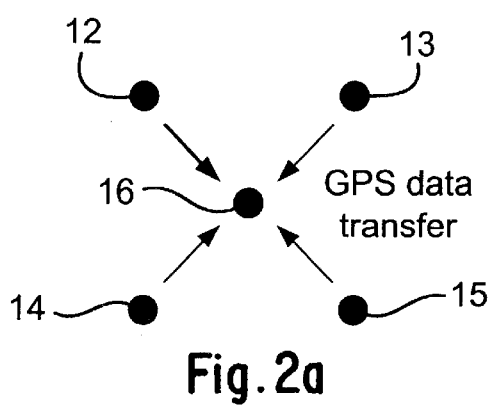
Figure 2B:
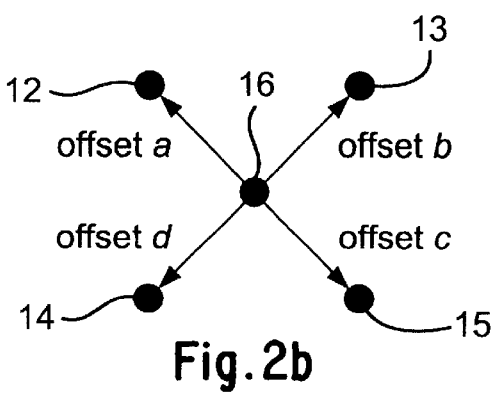

The algorithm starts with step 17a, by collating the GPS data (17b) from the various sites 12, to 16, as shown in FIG. 2a, and processing it at step 18, to determine primary offsets a, b, c, and d, as shown in FIG. 2b, which are required by an aircraft height measuring system in which timing-offsets at a plurality of locations are required.

Figure 2C:
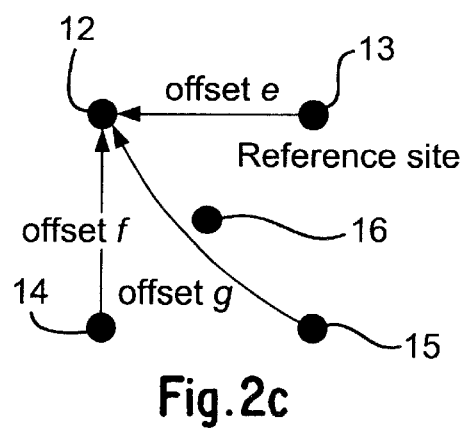
Figure 2D:
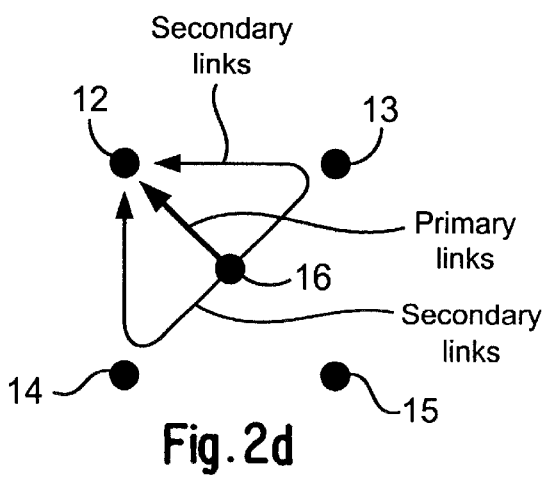

Having calculated the primary offsets a, b, c, and d, a reference site 16, is nominated, step 19, against which all of the primary offsets a, b, c, d, are related, the reference site 16, being given zero timing offset by definition. Following this, secondary timing-offsets e, f, and g, as shown in FIG. 2c are calculated, step 20, (using indirect signal paths) and stored, using the same method as for calculating the primary timing-offsets. It is important to note that the secondary timing-offsets are only used for the purposes of this algorithm and are not required in the height measuring system.

Following from this, the integrity and accuracy of each primary timing-offset is considered in turn by repeatedly performing a loop operation comprising steps 21, to 27, which are sequentially executed for each primary timing-offset in turn, so that a number of alternative estimations are made using the secondary timing-offsets thereby to produce for each primary timing-offset a weighted average derived from corresponding secondary timing-offsets against which each primary timing-offset is checked for consistency.

This could continue for all secondary paths considered relevant, but due to the fact that errors tend to increase with the number of link sections, it may be necessary in some cases to limit the number of secondary links.

Thus by checking each primary timing-offset against at least one secondary timing-offset calculated using alternative signal paths, a system confidence figure may be computed which can be monitored to provide an immediate indication if primary timing-offset measurements are prejudiced by a system error.

It will be appreciated that the system as herein described may find various applications and accordingly modifications may be made to the system described without departing from the scope of the invention as broadly conceived. For example, the system may be used to measure the height of an aircraft, as hereinbefore mentioned, using the difference in the times of arrival of a signal transmitted from an aircraft, at several widely spaced receiving locations.

What is claimed is:

1. A time offset measurement system for the timing of events at spaced apart locations comprising at each location, a dual frequency Global Positioning System (GPS) receiver having operatively associated with it a GPS antenna, wherein both the GPS receiver and the antenna are dual frequency (L1, L2), and the former is capable of both Coarse Acquisition (C/A) Code and carrier phase measurements, a frequency reference source giving local time, a data-logger for logging GPS data, a Time Interval Counter (TIC) used to measure the time of a local event as defined by the frequency reference source relative to time as determined based on GPS data and further comprising a central processor system (CPS), and a communication system via which the logged GPS data and time interval data, are received at the CPS from each location, the CPS being arranged to derive in accordance with a predetermined algorithm, for each pair of sites a primary time-offset figure based on a direct signal path between the sites, and a secondary time-offset figure based on at least one indirect signal path between the sites, wherein confidence that correct system operation is obtained is indicated based upon correspondence between the primary and secondary time-offset figures.

2. A system as claimed in claim 1, wherein the secondary time-offset figure is an aggregate time-offset figure based on a plurality of indirect signal paths between the sites.

3. A system as claimed in claim 1, wherein the frequency reference is integral with the GPS receiver.

4. A system as claimed in claim 3, wherein the GPS receiver is adapted to receive a clock signal from an external source.

5. A system as claimed in claim 1, wherein the frequency reference comprises a quartz crystal oscillator or a rubidium oscillator.

6. A system as claimed in claim 1, wherein the dual frequency GPS antenna has calibrated group delay characteristics with temperature.

7. A system as claimed in claim 1, wherein the antenna comprises a passive dual-band patch with a short cable run removing the need for amplifiers or filters which might give unpredictable temperature characteristics.

8. A system as claimed in claim 1, wherein the data logger comprises a PC.

9. A system as claimed in claim 1, wherein the CPS is co-located with one of the GPS receivers.

10. A system, as claimed in claim 1, used to measure the time difference between reception of pulses, transmitted from an aircraft and received at several spaced apart locations, from which the height of the aircraft can be established.

* * * * *